United States Patent [19]

Szycher

[11] Patent Number: 4,523,005
[45] Date of Patent: * Jun. 11, 1985

[54] EXTRUDABLE POLYURETHANE FOR PROSTHETIC DEVICES PREPARED FROM A DIISOCYANATE, A POLYTETRAMETHYLENE ETHER POLYOL, AND 1,4-BUTANE DIOL

[75] Inventor: Michael Szycher, Lynnfield, Mass.

[73] Assignee: Thermedics, Inc., Woburn, Mass.

[*] Notice: The portion of the term of this patent subsequent to May 8, 2001 has been disclaimed.

[21] Appl. No.: 600,568

[22] Filed: Apr. 17, 1984

Related U.S. Application Data

[63] Continuation-in-part of Ser. No. 479,922, Apr. 4, 1983, Pat. No. 4,447,590, which is a continuation of Ser. No. 316,922, Oct. 30, 1981, abandoned.

[51] Int. Cl.$^3$ .............................................. C08G 18/30
[52] U.S. Cl. ...................................................... 528/76
[58] Field of Search ......................... 528/76, 479, 922

[56] References Cited

U.S. PATENT DOCUMENTS 2,899,411 8/1959 Schollenberger ...................... 528/76
4,131,604 12/1978 Szycher .................................. 528/79

FOREIGN PATENT DOCUMENTS

| 980435 | 10/1961 | United Kingdom . |
| 1075467 | 6/1964 | United Kingdom . |
| 1240116 | 6/1968 | United Kingdom . |
| 1351773 | 7/1971 | United Kingdom . |
| 1351774 | 7/1971 | United Kingdom . |
| 1529319 | 12/1975 | United Kingdom . |
| 2024233 | 7/1979 | United Kingdom . |

*Primary Examiner*—Maurice J. Welsh
*Attorney, Agent, or Firm*—Anthony M. Lorusso

[57] ABSTRACT

Reaction product of an aliphatic organic diisocyanate, a high molecular weight polyether polyol (poly tetra methylene ether glycol) and 1,4 butane diol. The resulting polymers have thromboresistant properties, a long flexural life and are extrudable. The polyurethane polymer is ideal for forming transvenous cardiac pacemaker leads, blood bags, intravenous and intra-arterial catheters and tubing, and other shaped devices which must be formed of a blood compatible material.

4 Claims, No Drawings

EXTRUDABLE POLYURETHANE FOR PROSTHETIC DEVICES PREPARED FROM A DIISOCYANATE, A POLYTETRAMETHYLENE ETHER POLYOL, AND 1,4-BUTANE DIOL

CROSS REFERENCE TO RELATED APPLICATIONS

This application is a continuation-in-part of U.S. application Ser. No. 479,922, filed Apr. 4, 1983, entitled "Extrudable Polyurethane for Prosthetic Devices" and now U.S. Pat. No. 4,447,590, issued May 8, 1984, which is a continuation of U.S. application Ser. No. 316,922, filed Oct. 30, 1981, entitled "Extrudable Polyurethane for Prosthetic Devices" and now abandoned.

BACKGROUND OF THE INVENTION

Significant advances have been made in recent years in development of vascular prosthesis. For example, U.S. Pat. No. 4,131,604 to Szycher entitled Polyurethane Elastomer for Heart Assist Devices discloses a family of polyurethanes with excellent properties which can be used to form moldable prosthetic devices. However, one deficiency of the polyurethane disclosed in that patent is that the polyurethanes are not extrudable. There are many prosthetic devices as well as other devices, which can only be manufactured efficiently by extrusion or blow molding, which must be blood compatible.

It should be apparent that devices such as pacemaker leads, blood bags, catheters, and I.V. tubing must be formed of a material that meets a number of criteria. The most significant criteria is that the material from which such devices are fabricated must be non-toxic and hemocompatible. That is, the material does not induce the formation of a thrombus which can embolize into the distal bloodstream. In addition to the foregoing, it is desirable that materials for devices to be used in manufacturing vascular prothesis possess a high degree of resiliency, strength and an ability to flex without breakage. As is mentioned above for the formation of certain devices, it is desirable that the material be extrudable.

SUMMARY OF THE INVENTION

This invention relates to a family of extrudable polyurethane polymers specifically developed for use in devices that require a high degree of blood compatibility. The polymers can be characterized as essentially linear, segmented, aliphatic polyurethane elastomers. This family of aliphatic and polyether-based polymers with 100% urethane linkages in the molecular backbone, exhibit superior flexural life, outstanding hydrolytic stability, and a high degree of blood compatibility. In addition to the foregoing, the polymers can be pelletized and extruded to form a variety of shaped devices such as cardiac pacemaker leads, blood bags, catheters and I.V. tubing. This unusual combination of properties make these polymers useful in devices requiring blood contact surfaces.

It is therefore an object of this invention to provide an extrudable material suitable for use in forming devices that are non-toxic and highly compatible with blood.

DESCRIPTION OF THE PREFERRED EMBODIMENT

At the outset, the invention is described in its broadest overall aspects with a more detailed description following. The polyurethane elastomer of the present invention is a rubbery reaction product of aliphatic organic diisocyanates, high molecular weight polyether polyols and a specific low molecular weight glycol (chain extender). The low molecular weight glycol is 1,4 butane diol.

In addition to the foregoing required constituents, the reaction constituents preferably includes a catalyst and optionally an antioxidant and a lubricant for extrusion.

In general, polyurethane polymers are the condensation product of reactions between diisocyanates and compounds containing active hydrogen sites such as hydroxyl groups.

A diisocyanate is an isocyanate compound having a functionality of two. The polymerization takes place in the presence of a difunctional hydroxyl compound (this can be either a simple glycol or a macromolecular glycol).

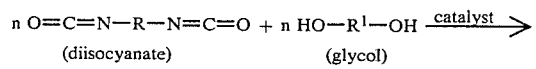

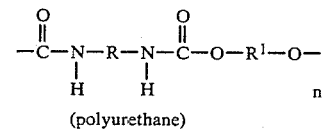

The preferred diisocyanate for forming polymers in accordance with this invention is dicyclohexyl methane diisocyanate (HMDI).

dicylohexyl methane diisocyanate (HMDI),

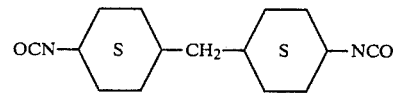

Although a number of aliphatic diisocyanates can be utilized in preparing a polymer in accordance with the present invention, numerous tests have indicated that the selection of the high molecular weight polyol is limited to poly tetra methylene ether glycol (PTMEG); H—(O—CH$_2$—CH$_2$—CH$_2$—CH$_2$)$_n$—OH. Stated another way, this high molecular weight polyol is the only polyol which has been found to produce a polyurethane which is hemocompatible and possess the other properties discussed above. In general, this high molecular weight polyol should have an average molecular weight between about 500 and 5000. PTMEG with a molecular weight of 1000 to 2000 is utilized in the preferred embodiment of this invention.

As was stated above, the chain extender for the polymer of the present invention is 1,4 butane diol, (HO—CH$_2$—CH$_2$—CH$_2$—CH$_2$—OH).

The preferred polyurethane has the following structural formula:

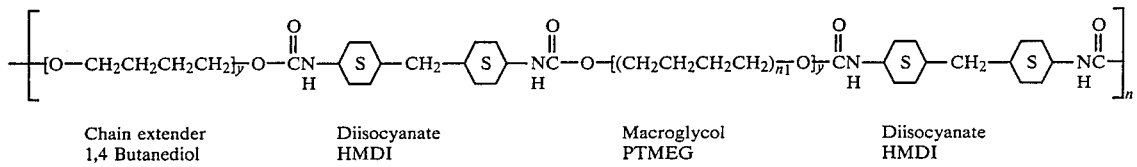

| | Chain extender 1,4 Butanediol | Diisocyanate HMDI | Macroglycol PTMEG | Diisocyanate HMDI | where $n_1$ is an integer selected to give a molecular weight between 500–5,000, n is an integer selected to give a number average molecular weight of 120,000 to 180,000 units, and a weight average molecular weight of 285,000 to 335,000 molecular weight units, and x and y are the relative proportions of 1,4-butane diol to PTMEG.

As can be seen from the above formula, the polymer of the present invention is composed of three repeating units, the diol, the diisocyanate, and the macroglycol. The relationship of these repeating units to each other is determined by the physical characteristics desired. As disclosed in the parent application, tubing which should be soft and elastomeric (80 Shore A), has a ratio of diol to macroglycol of one to one. Since the diisocyanate links both the diol and the macroglycol there are two diisocyanates for each diol or glycol in this example. To produce harder material, the ratio of diol to glycol is increased. For example, catheters with a hardness of 60 Shore D have a ratio of diol to glycol of 1.3 to 0.7. The number of diisocyanate units is greater than or equal to the combined number of 1,4-butanediol and PTMEG units.

It is conventional to quantify hardness according to its Shore value. As the number increases, the hardness increases. For example, 95 Shore A is harder than 90 Shore A. At a hardness of 95 Shore A, the notation is converted to 50 Shore D. Accordingly, 60 Shore D is harder than 90 Shore A.

The molecular weight of the PTMEG is another factor in determining the hardness of the resulting molecule. In the above example, PTMEG of 2,000 molecular weight is used in the soft (80 Shore A) material taught by the parent application and PTMEG of 1,000 molecular weight is used in the hard (60 Shore D) material.

The reactants are provided in approximately the molar amounts necessary to produce the foregoing polymer. Further examples of polymers of varying hardness may be prepared according to the following table:

| Hardness | HMDI | PTMEG | Diol | Mw | Mn |
|---|---|---|---|---|---|
| 90 Shore A | 2.0 | 0.9 | 1.1 | 335,000 | 180,000 |
| 95 Shore A | 2.0 | 0.7 | 1.3 | | |
| 65 Shore D | 2.0 | 0.5 | 1.5 | 285,000 | 120,000 | where Mw is weight average molecular weight; Mn is the number average molecular weight; and
HMDI: moles dicyclohexyl methane diisocyanate
PTMEG: moles poly tetra methyl ether glycol
Diol: moles 1,4-butanediol To obtain fully cured polyurethane castings in a reasonably short period of time, it is customary to incorporate into the mixture a suitable catalyst to promote the polymerization reaction. Suitable catalysts include N-methyl morpholine, trimethyl amine, triethyl amine, zinc octoate, dibutyl tin dilaurate and N-methyl morpholine. Dibutyl tin dilaurate is the preferred catalyst.

The polyurethane is prepared from two components which can be referred to as part A and part B. Part A is the aliphatic diisocyanate. Part B is comprised of the other constituents: a macroglycol (the polyether base), the low molecular weight chain extender, the catalyst, the antioxidant and the lubricant. Of course the catalyst, antioxidant and lubricant do not combine chemically as part of the polymer.

To form a polyurethane element, the proper stoichiometric proportions of part A and part B are emulsified by a mixer at room temperature to form a moderately reactive thixotropic mixture having a viscocity below about 2500 cps.

Since the emulsification step introduces air into the reactive mixture, the air must be removed. The air bubbles are removed by placing a vessel containing the emulsion under a bell jar and evacuating the air from the bell jar with a suction device. The bell jar is evacuated to a pressure of about 0.3 microns and the mixture is kept under the bell jar about 8 minutes causing the mixture to appear to boil. After the emulsion is taken from the bell jar, it is allowed to stand until the exothermic reaction that is taking place brings it to a temperature of about 40° C.

At this point, the emulsion is preferably poured into a pan where it is allowed to flow to form uncured sheets. The pan with the sheets is then placed in an oven and heated at a temperature of at least 110° C. for four hours or more until the elastomer is cured. The sheets are then chopped and subsequently pelletized in a standard pelletizer resulting in pellets approximately ¼ inch in length. These pellets are then used in machinery suitable for an extrusion of the desired product.

In an optional embodiment of the invention, it is also possible to dissolve the pellets in a solvent such as dimethyl acetamide, tetrahydrofuran, 1,4 dioxane, or m-pyrrol. The solution can then be used to make an article by the solvent casting method.

The invention is further illustrated by the following non-limiting example.

EXAMPLE 1

122 grams of dicyclohexyl methane diisocyanate (HMDI) was reacted with a mixture of the following five constituents: 151 grams of 1000 molecular weight polytetramethylene ether glycol, 24 grams of 1,4 butane diol, 3 grams of tetrakis[methylene(3,5ditert-butyl 4-hydroxyhydrocinnamate)]methane as the antioxidant, 0.5 grams of ethylene bis oleamide as the extrusion lubricant, and 0.03 grams of dibutyl tin dilaurate as the catalyst.

The above constituents were mixed with the HMDI, deaerated until all entrained gases were removed. The mixture was then cured at 110° C. for three hours under a nitrogen atmosphere in the form of sheets. The sheets were then chopped and pelletized to produce plastic cylinders of uniform and reproducible dimensions, suitable for extrusion.

The physical properties of the cured elastomer were as follows: tensile strength 5000 psi, elongation 550 W/O and a hardness of 90 Shore A.

The pellets were then processed in a laboratory extruder. Processing conditions were determined on a 1" diameter, 24/1 length-to-diameter (L/D) general purpose screw, as shown below:

| Rear Temperature | 290° F. |
| Middle Temperature | 310° F. |
| Front Temperature | 310° F. |
| Die Temperature | 320° F. |

Medical-grade tubing was extruded in sizes appropriate for use in catheters, using the above extruder setting conditions. The tubing exhibited all the desirable physical characteristics previously discussed. Obviously, this tubing could also be used to produce other clinically-useful products such as intravenous lines, dialysis tubing, pacemaker lead insulation, etc.

EXAMPLE 2

140 grams of dicyclohexyl methane diisocyanate (HMDI) was reacted with a mixture of the following five constituents: 115 grams of 1000 molecular weight polytetramethylene ether glycol, 42 grams of 1,4 butane diol, 3 grams of tetrakis[methylene(3,5ditert-butyl 4-hydroxyhydrocinnamate)]methane as the antioxidant, 0.5 grams of ethylene bis oleamide as the extrusion lubricant, and 0.03 grams of dibutyl tin dilaurate as the catalyst.

The above constituents were mixed with the HMDI and deaerated until all entrained gases were removed. The mixture in the form of pellets was then cured at 110° C. for three hours under a nitrogen atmosphere. The sheets were then chopped and pelletized to produce plastic cylinders of uniform and reproducible dimensions, suitable for plastic extrusion.

The physical properties of the cured elastomer were as follows: tensile strength 5800 psi, elongation 400%, and a hardness at 65 Shore D.

The pellets were then processed in a laboratory extruder. Processing conditions were determined on a 1" diameter, 24/1 length-to-diameter (L/D) general purpose screw, as shown below:

| Rear Temperature | 300° F. |
| Middle Temperature | 320° F. |
| Front Temperature | 320° F. |
| Die Temperature | 330° F. |
| Throat | Water cooling |

Tubing was extruded into sizes appropriate for use in all medical applications, with the tubing exhibiting all the desirable physical characteristics previously discussed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A polymer for use in extruding and molding devices requiring a high degree of blood compatibility, said polymer consisting essentially of a polyurethane elastomer which is the reaction product of:
    (a) dicyclohexyl methane diisocyanate;
    (b) a polytetramethylene ether polyol having a molecular weight in the range of 1000–3000; and
    (c) 1,4 butane diol, wherein the number of moles of dicylohexyl methane diisocyanate molecules is equal to the sum of the number of moles of polytetramethylene ether polyol and the number of moles of 1,4 butane diol; the molar ratio of 1,4 butane diol to polytetramethylene ether glycol is between 1.1 to 0.9 and 1.5 to 0.5; and the average molecular weight of the polymer is 120,000–180,000 units, and a weight average molecular weight of 285,000–335,000 molecular weight units.

2. The polymer of claim 1 wherein the molar ratio of 1,4 butane diol to polytetramethylene ether polyol is 1.3 to 0.7.

3. The polymer of claim 2 wherein the molecular weight of the polytetramethylene ether is 1000.

4. The polymer as set forth in claim 1 wherein the polymer has incorporated therein one or more of the following components:
    (1) a catalyst;
    (2) an anti-oxidant; and
    (3) an extrusion lubricant.

* * * * *